United States Patent [19]

Thornberg et al.

[11] Patent Number: 5,552,983
[45] Date of Patent: Sep. 3, 1996

[54] VARIABLE REFERENCED CONTROL SYSTEM FOR REMOTELY OPERATED VEHICLES

[75] Inventors: Christopher A. Thornberg, Newtown; Bryan S. Cotton, Monroe, both of Conn.

[73] Assignee: United Technologies Corporation, Hartford, Conn.

[21] Appl. No.: 204,706

[22] Filed: Mar. 2, 1994

[51] Int. Cl.[6] .................................................. G06F 165/00
[52] U.S. Cl. ...................... 364/424.01; 244/3.11; 341/176; 180/167
[58] Field of Search .................. 364/424.01, 434, 364/559, 424.02; 180/167; 244/3.11, 3.14, 190; 340/825.72; 341/176

[56] References Cited

U.S. PATENT DOCUMENTS

| | | | |
|---|---|---|---|
| H1469 | 8/1995 | Simonoff | 341/176 |
| 3,557,304 | 1/1971 | Rue et al. | 178/6.8 |
| 4,405,943 | 9/1983 | Kanaly | 358/133 |
| 4,714,140 | 12/1987 | Hatton et al. | 180/20 |
| 4,976,435 | 12/1990 | Shatford et al. | 273/148 B |
| 5,226,204 | 7/1993 | Schoenberger et al. | 14/71.5 |

FOREIGN PATENT DOCUMENTS 0522829  1/1993  European Pat. Off. .

*Primary Examiner*—Michael Zanelli
*Attorney, Agent, or Firm*—Michael Grillo

[57] ABSTRACT

A frame of reference is selected, and control inputs provided by a vehicle operator are transformed to account for the orientation of a remotely operated vehicle with respect to the selected frame of reference such that the remotely operated vehicle responds to the control inputs with respect to the selected frame of reference. An earth frame of reference may be selected based on a fixed true heading, e.g., North, or based on the initial orientation of the vehicle operator. Alternatively, a vehicle frame of reference may be selected which provides a fixed frame of reference with respect to the vehicle and a variable frame of reference with respect to the vehicle operator. A vehicle operator frame of reference may also be selected based on the orientation of the vehicle operator with respect to earth, and control commands are transformed based on changes in both the operator orientation with respect to the earth reference and the remotely operated vehicle orientation with respect to the earth reference, which provides a fixed frame of reference with respect to the vehicle operator and a variable frame of reference with respect to the vehicle. The remotely operated vehicle heading transformation may be based on a selected forward, fixed or variable point on the vehicle related to a vehicle center of gravity, a forward part of the vehicle, the location of a sensor on the vehicle, or some other arbitrary reference location on the vehicle.

7 Claims, 4 Drawing Sheets

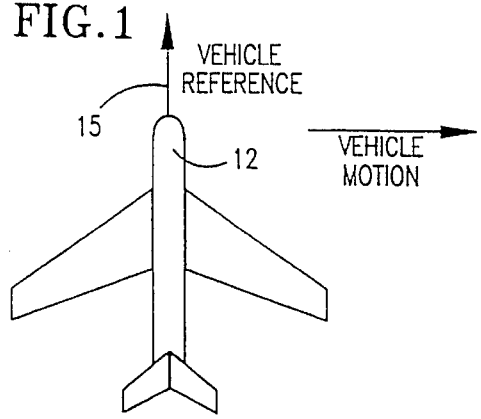
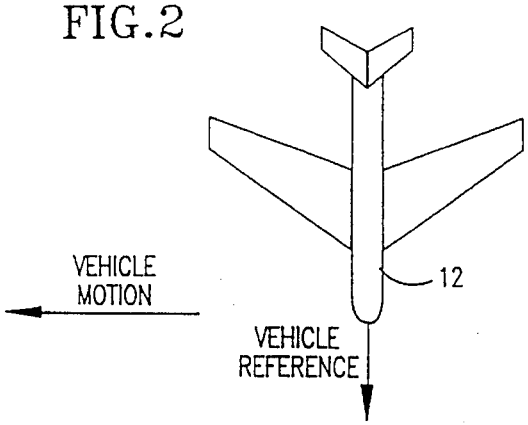
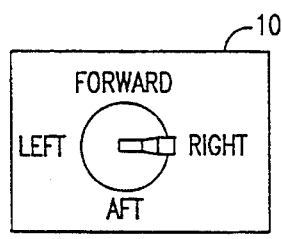
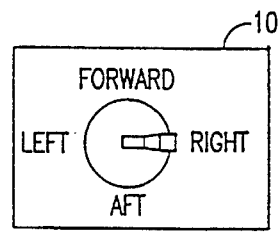
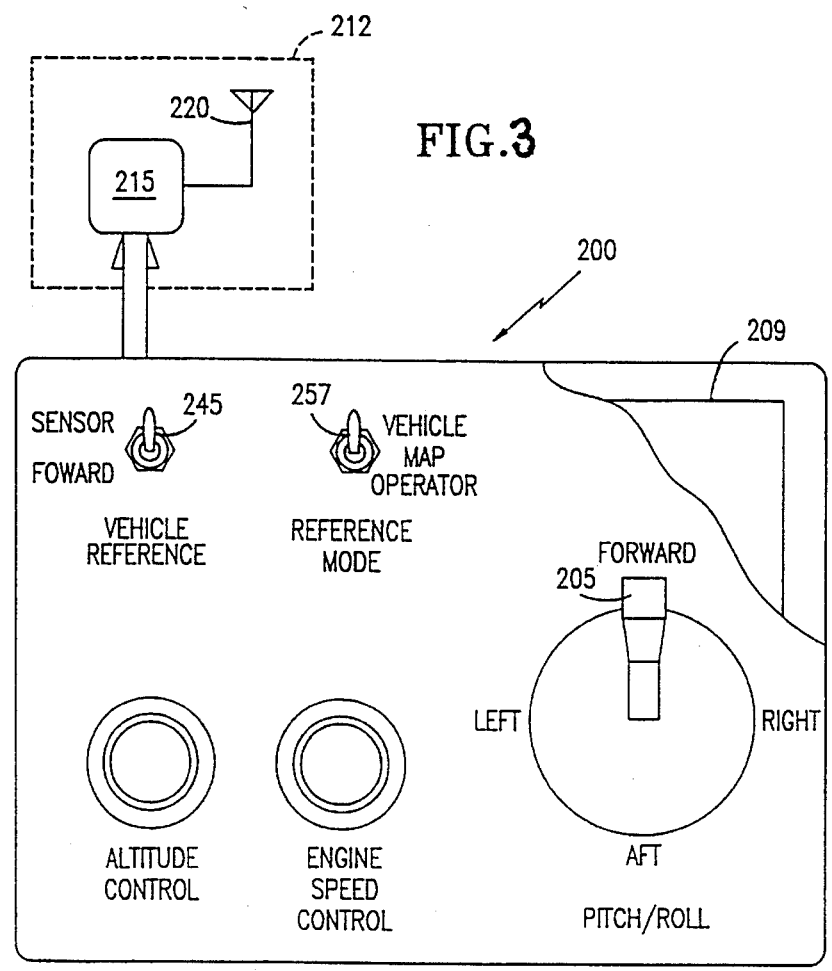

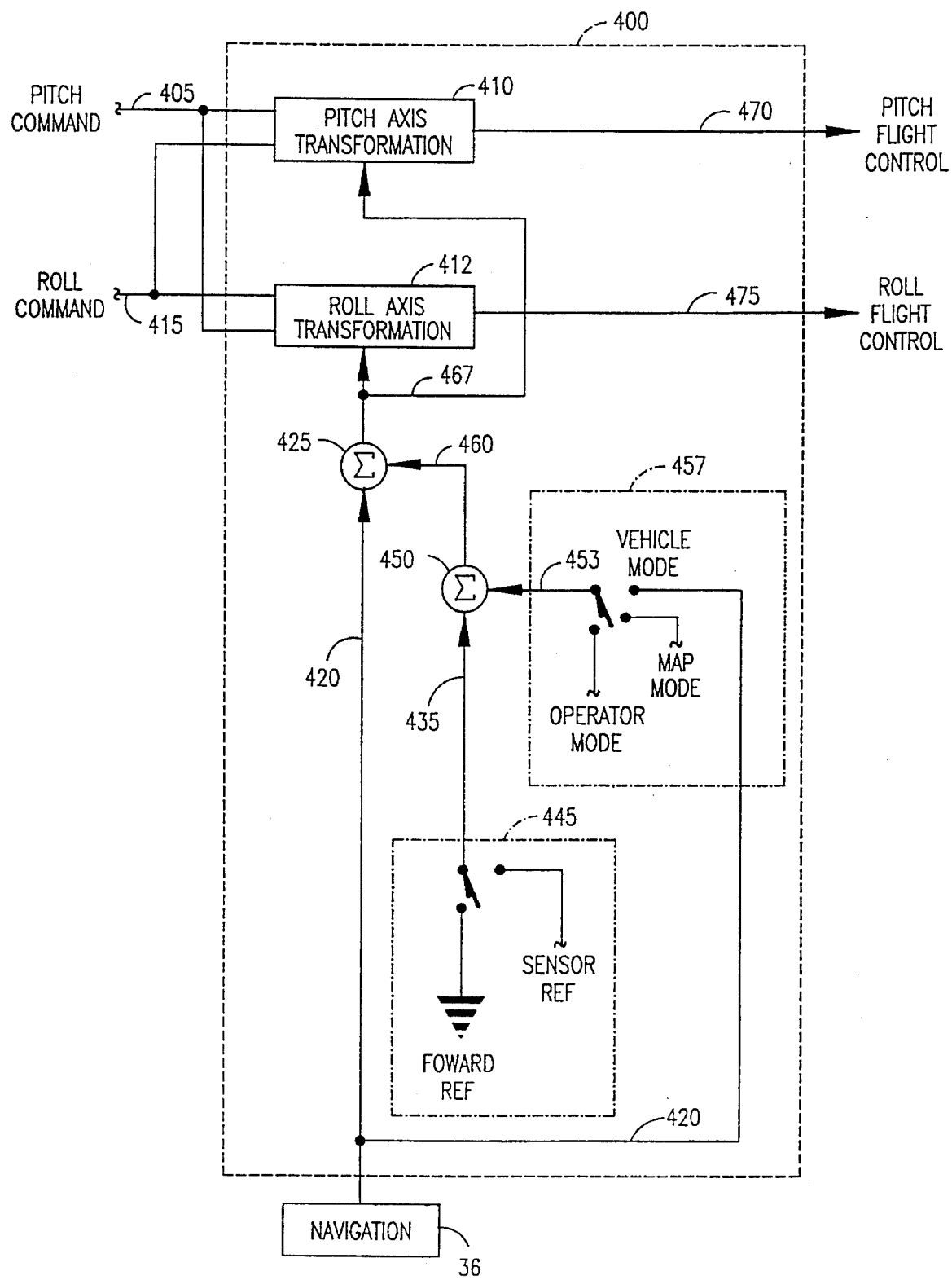

VARIABLE REFERENCED CONTROL SYSTEM FOR REMOTELY OPERATED VEHICLES

TECHNICAL FIELD

The present invention relates to the control of remotely operated vehicles, and more particularly to a variable reference for the control of a remotely operated vehicle.

BACKGROUND OF THE INVENTION

There are a variety of uses for remotely operated vehicles including military, industrial and entertainment/recreation applications. For entertainment/recreation applications, remotely operated model airplanes, helicopters, automobiles, ships and sail boats are well known. In an industrial application, it is well known to use a remotely operated vehicle to complete high risk or difficult tasks such as inspection, maintenance and repair in a high radiation area, exploration of extreme water depths, and airborne surveillance.

Within the military spectrum, there has been a recent resurgence in the interest in unmanned aerial vehicles (UAVs) for performing a variety of missions where the use of manned flight vehicles is not deemed appropriate, for whatever reason. Such missions include surveillance, recognizance, target acquisition and/or designation, data acquisition, communication data linking, decoy, jamming, harassment, or one way supply flights. Similarly, it has long been the practice of remotely controlling torpedo's for underwater delivery of ordinance.

An obvious difference between a manned and remotely operated vehicle relates to the control or pilotage of the vehicle. In a manned vehicle, the operator sits within the vehicle and inputs control signals related to the desired vehicle response. In such a case, all requests by the vehicle operator are based on a vehicle frame of reference. For example, in an aircraft, control requests are typically input by a pilot via a control stick. If the pilot wishes to move the aircraft forward, he inputs a forward movement of the control stick, which pitches the aircraft in the forward direction. Similarly, if the pilot wishes to move the aircraft to the right, he inputs a right lateral stick motion which, in turn, rolls the aircraft to the right.

A problem associated with operating remotely operated vehicles is that when the vehicle operator controls the vehicle from a distant location, commands referenced to the operator's body or operator frame of reference may result in undesired vehicle motion. Typically, the motion of a remotely operated vehicle is governed by the direction in which a fixed reference point or axis on the vehicle is pointing, e.g., the direction that the vehicle nose or front is pointing. Referring to the example of FIG. 1, if the vehicle operator 10 and the vehicle 12 have the same forward orientation or frame of reference, then control inputs by the vehicle operator 10 will result in a corresponding change in vehicle motion, e.g., if the vehicle operator commands a right motion of the vehicle, the vehicle 12 will move/turn to the right. However, as shown in the example of FIG. 2, if the vehicle is moving towards the vehicle operator 10 then a control input by the vehicle operator will result in opposite motion of the vehicle, e.g., if the vehicle operator commands a right motion of the vehicle, the vehicle will actually move/turn left with respect to the vehicle operator.

Therefore, existing methods for controlling remotely operated vehicles rely greatly on operator skill. With a considerable amount of training, an operator can learn to operate a remotely operated vehicle proficiently in most spatial relationships of the vehicle with respect to the operator. However, under high workload and stress conditions, the non-intuitive control of a remotely operated vehicle may result in inadvertent and unwanted motion of the remotely operated vehicle.

DISCLOSURE OF THE INVENTION

Objects of the invention include the provision of an improved control system for controlling a remotely operated vehicle which provides a variable frame of reference for control of the remotely operated vehicle.

Another object of the present invention is to provide a control system for a remotely operated vehicle which allows a vehicle operator to select a vehicle reference axis for purposes of determining the control response of the vehicle.

A further object of the present invention is to provide a vehicle control system for a remotely operated vehicle which allows the vehicle operator to select between a vehicle frame of reference, an earth frame of reference, and a variable frame of reference for controlling the operation of a remotely operated vehicle.

According to the present invention, a frame of reference is selected, and control inputs provided by a vehicle operator are transformed to account for the orientation of a remotely operated vehicle with respect to the selected frame of reference such that the remotely operated vehicle responds to the control inputs with respect to the selected frame of reference.

In further accord with the present invention, an earth frame of reference may be selected based on a fixed heading, e.g., North, or based on the initial orientation of the vehicle operator. Alternatively, a vehicle frame of reference may be selected which provides a fixed frame of reference with respect to the vehicle and a variable frame of reference with respect to the vehicle operator. A vehicle operator frame of reference may also be selected based on the orientation of the vehicle operator with respect to earth, and control commands are transformed based on changes in both the operator orientation with respect to the earth reference and the remotely operated vehicle orientation with respect to the earth reference, which provides a fixed frame of reference with respect to the vehicle operator and a variable frame of reference with respect to the vehicle.

In still further accord with the present invention, the remotely operated vehicle heading transformation may be based on a selected forward, fixed or variable point on the vehicle related to a vehicle center of gravity, a forward part of the vehicle, the location of a sensor on the vehicle, or some other arbitrary reference location on the vehicle.

The present invention provides a simplified control of a remotely operated vehicle by allowing the vehicle operator to select a frame of reference for control signals based on a vehicle operator reference or a fixed earth reference as opposed to a vehicle reference. A fixed earth reference is particularly useful when controlling vehicle motion based on the indicated location of the vehicle on an electronic map, the map having a fixed earth frame of reference. Therefore, the invention allows an unskilled or relatively inexperienced operator to control a remotely operated vehicle without the associated disorientation when the vehicle movements become non-intuitive, as in the prior art. Additionally, by allowing the remotely operated vehicle heading transformation to be based on the location of a sensor on the vehicle, the vehicle may be controlled such that variations in control inputs will control the pointing direction of the sensor.

The foregoing and other objects, features and advantages of the present invention will become more apparent in the following detailed description of exemplary embodiments thereof, as illustrated in the accompanying drawings.

BRIEF DESCRIPTION OF THE DRAWINGS

FIG. 1 is a schematic block diagram of a remotely operated vehicle and an operator control panel showing vehicle response to control inputs when the vehicle and control panel share the same frame of reference;

FIG. 2 is a schematic block diagram of a remotely operated vehicle and an operator control panel showing vehicle response to control inputs when the vehicle and control panel have opposing frames of reference;

FIG. 3 is a perspective view, partially broken away, of a remotely operated vehicle having a variable referenced control system of the present invention;

FIG. 6 is a schematic block diagram showing the command transformation utilized by a flight control computer of the remotely operated vehicle of FIG. 3.

BEST MODE FOR CARRYING OUT THE INVENTION

Figure 4:
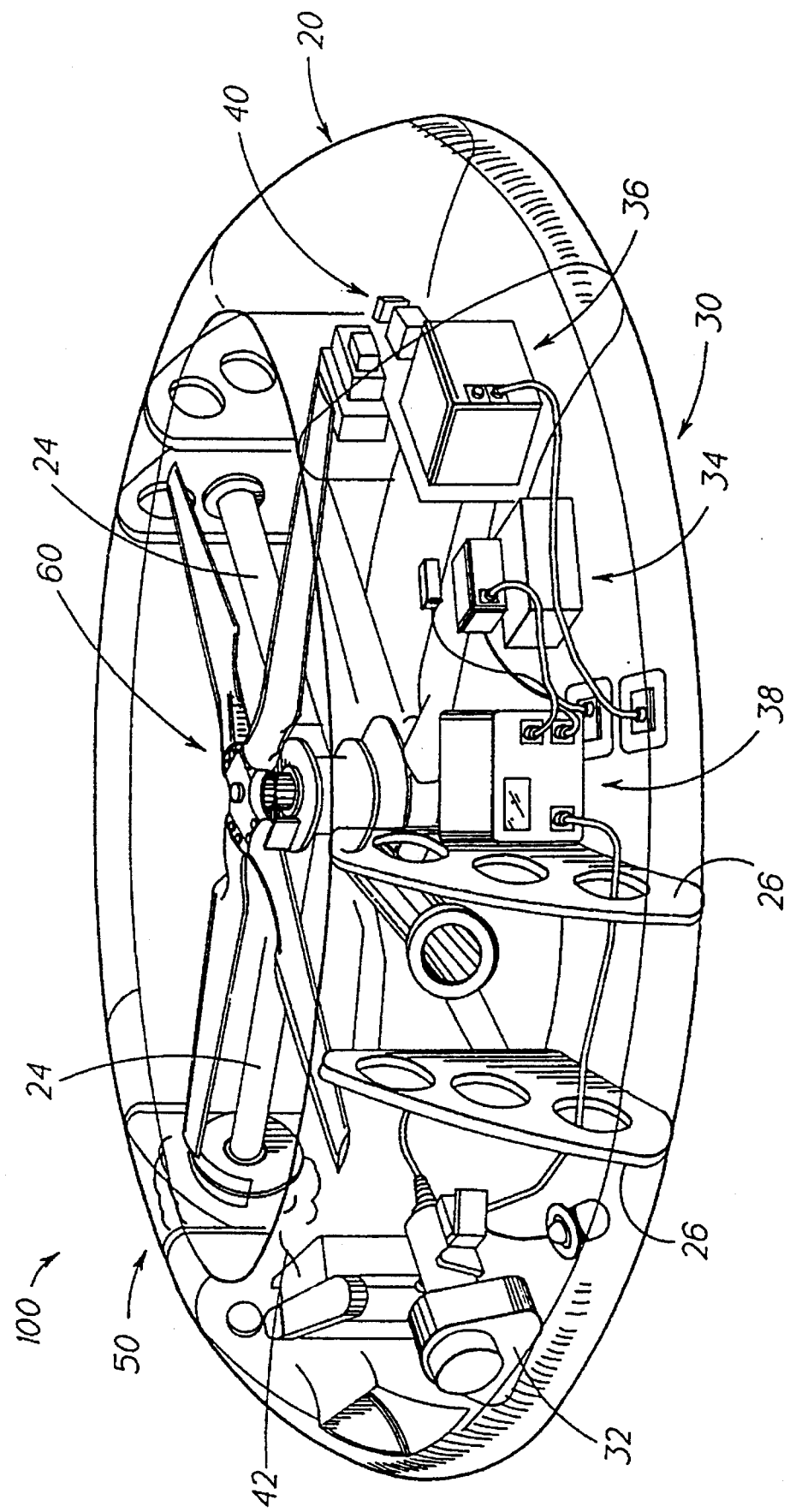
FIG. 4 is a schematic block diagram, partially broken away, of an operator control panel used with the remotely operated vehicle of FIG. 3.

The variable referenced control system for a remotely operated vehicle of the present invention is particularly well suited for allowing the optimum control of a remotely operated vehicle based on both operator and mission considerations. The system provides for the referencing of vehicle commands based on an operator frame of reference so that control commands provided by the operator remain intuitive and independent of the orientation of the vehicle with respect to the operator. Additionally, the system provides for the referencing of vehicle position based on a vehicle sensor, thereby allowing the operator to easily control the pointed direction of a sensor on the vehicle for improved accuracy in the receipt of intelligence. A further advantage of providing a fixed reference for a remotely operated vehicle is the ease of controlling the vehicle when the position of the vehicle is indicated on an electronic map having a fixed frame of reference.

The present invention will be described in the context of an unmanned aerial vehicle (UAV). However, it will be understood by those skilled in the art that the variable referenced control system of the present invention may be applied to any remotely operated vehicle provided that the vehicle contains a navigation system or other means for determining changes in vehicle orientation with respect to an operator or fixed frame of reference.

Referring to FIG. 3, one embodiment of an UAV 100 is shown. The UAV used in the example of the present invention comprises a toroidal fuselage or shroud 20 having an aerodynamic profile, flight/mission equipment 30, a power plant subsystem 50, and a rotor assembly 60. The toroidal fuselage 20 is provided with a plurality of support struts 24 which are attached to the rotor assembly 60 and are operative to supported the rotor assembly 60 in fixed coaxial relation with respect to the toroidal fuselage 20. The toroidal fuselage 20 contains forward located internal bays 26 which are typically utilized for sundry flight/mission equipment 30 as described herein below. Mission payload equipment 32 is preferably located, but not limited to, the internal bay 26. Generally the mission payload equipment 32 will consist of some types of passive sensors, e.g., infrared detectors, television cameras, etc., and/or active devices, e.g., lasers, radio communications gear, radar, etc., and the associated processing equipment. Other flight/mission equipment 30 such as avionics 34, navigation equipment 36, flight computer 38, communications gear 40 (for relaying real time sensor data and receiving real time command input signals), antenna, etc., are distributed in the various internal bays 26 as shown for example in FIG. 1. Distribution of the various flight/mission equipment 30 is optimized in conjunction with the placement of a power plant subsystem 50 within the toroidal fuselage 20.

The flight/mission equipment 30 described thus far is exemplary of the type which may be used in a UAV. However, as will be understood by those skilled in the art, a separate flight control computer, avionics, and navigation system are not necessarily required in order to perform the functions identified in the present invention. Alternatively, a single flight control computer or mission computer may be provided to perform the above identified functions.

Referring to FIG. 4, a control panel 200 for remote operator control of the UAV 100 (FIG. 1) is shown. The control panel 200 is provided with a joy stick or control stick 205 for providing control inputs to control the operation of the UAV. The control stick 205 is shown as being a two axis control stick wherein forward and aft movement of the control stick relates to pitch, and side-to-side movement of the control stick related to roll. A control panel computer 209 is provided for receiving the control commands provided by the control stick 205 and converting them into is signals to be transmitted via by communications equipment 212. The communications equipment 212 comprises a transmitter 215 for receiving the control commands provided from the control panel computer 209 and for transmitting the control commands via a control panel antenna 220.

Figure 5:
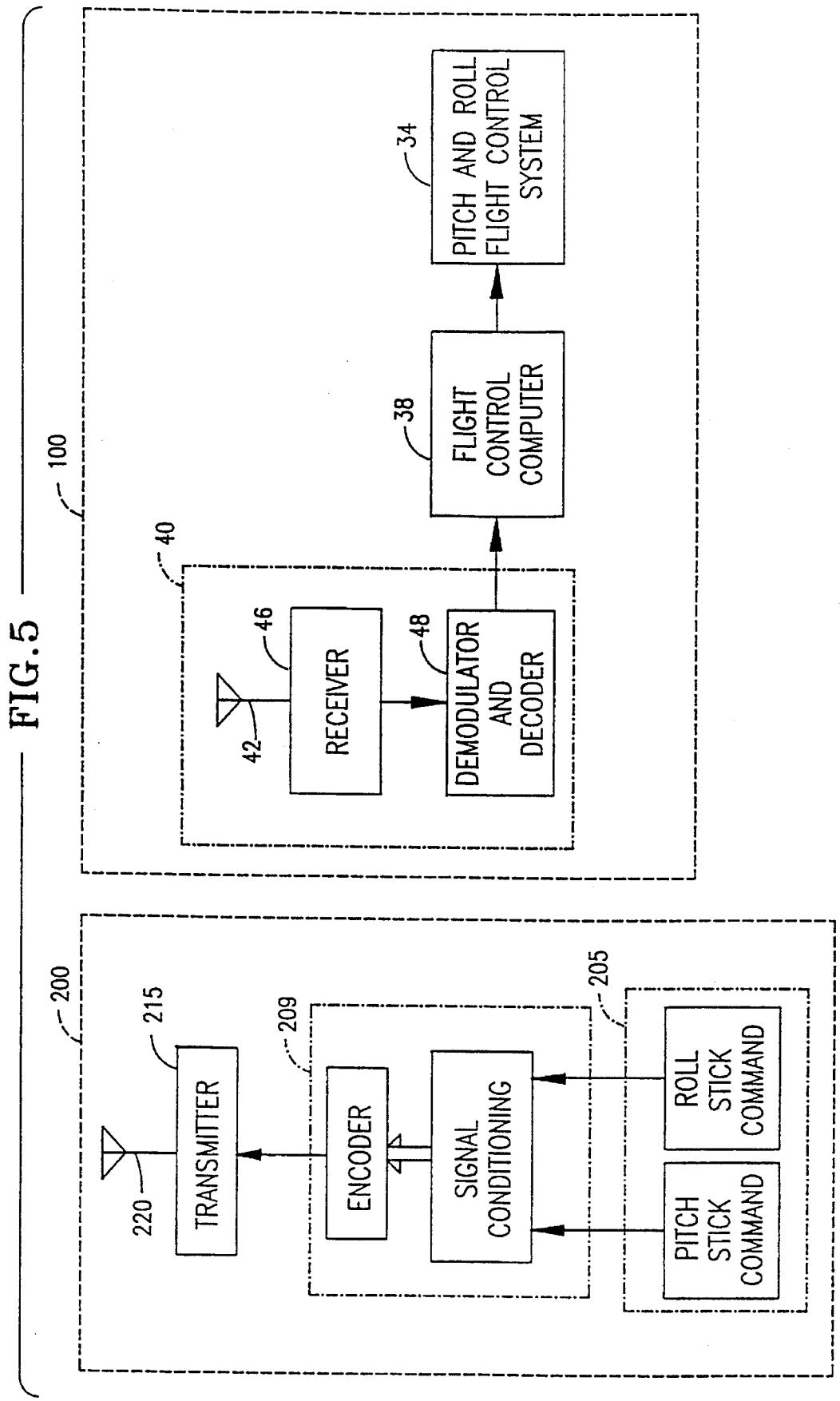
FIG. 5 is a schematic block diagram showing the transmission of control signals from the operator control panel of FIG. 4 to the remotely operated vehicle of FIG. 3.

Referring now to FIG. 5, when control signals are transmitted by the control panel via the antenna 220, the signals are received by the UAV antenna 42 and thereafter provided to the UAV communications equipment 40. The communications equipment comprises a receiver 46 and a demodulator/decoder 48 for receiving and decoding the received signals transmitted by the control panel. Thereafter, the demodulated and decoded control signals are provided to the flight control computer 38 and avionics equipment 34. The flight control computer 38 and avionics equipment 34 process the incoming control signals to thereby provide the appropriate control surface commands to the UAV control surfaces to perform the desired maneuvers.

All of the apparatus described thus far is exemplary of that which is known in the art. In a vehicle referenced control system of the prior art, a fixed reference point or location on the vehicle frame is selected as forward or the head of the vehicle, and in response to control signals, that reference point is maneuvered. Therefore, for example, if the operator inputs a right turn or roll command via the control panel, the UAV will turn the fixed reference point to the right, relative to the UAV frame of reference. However, depending on the orientation of the UAV with respect to the operator, a right turn command input by the operator at the UAV controller may look like a left turn to the operator if the UAV is heading towards the operator or if the UAV is "behind" the operator.

The variable referenced control system of the present invention allows the operator to select various different frames of reference for controlling the UAV, thereby allowing the operator to tailor the UAV control to the specific mission or operational requirements, and thereby provided for a simplified, intuitive control.

Referring to FIG. 6, the flight control computer is provided with a stick transformation function 400 which allows the operator to select between a variety of control references for controlling the remotely operated vehicle. A specific reference may be selected by repositioning a switch or entering a command on the control panel 200 (FIG. 2). Thereafter, the reference command is provided via the communications equipment and control panel antenna to the flight control computer via the communications equipment on the remotely operated vehicle.

The stick transformation function 400 is responsive to control signals received from the control panel and vehicle heading information for controlling the vehicle in accordance with the desired mode and reference. The pitch command (provided from the control panel via the vehicle communications equipment) is provided on a line 405 to a pitch axis transformation function 410 and a roll axis transformation function 412. Similarly, the roll command is provided on a line 415 to the pitch axis transformation function 410 and the roll axis transformation function 412. The other input to the pitch axis transformation function 410 and the roll axis transformation function 412 is a transformation angle ($\theta$). The transformation angle is determined based on the true heading of the vehicle as determined by the navigation system 36 and the desired vehicle reference and vehicle reference mode.

The vehicle's true heading is provided from the navigation equipment 36 on the vehicle, e.g., a ring laser gyro or an inertial navigation system. The true heading signal is indicative of the orientation of a fixed point on the aircraft with respect to true north. Typically, the reference point on the vehicle is determined to be the forward section on the vehicle as determined by design or other method such as using a center of gravity calculation. The center of gravity is used for the toroidal shape because the forward flight characteristics of the vehicle are improved. The true heading signal provided by the navigation system 36 is provided on a line 420 to a summing junction 425. The other input to the summing junction 425 is a reference heading signal on a line 460 which is provided as the output of a summing junction 450.

One input to the summing junction 450 is a vehicle reference signal on a line 435 provided by a vehicle reference switch 445. The operation of the vehicle reference switch 445 is dependent upon the position of a control panel vehicle reference switch 245 on the control panel 200 (FIG. 4). If the control panel vehicle reference switch 245 is in the forward reference position, then the vehicle reference for purposes of vehicle control is the forward reference position on the aircraft. However, if the control panel vehicle reference switch 245 is in the sensor reference position then control of the vehicle will be based on the sensor position on the vehicle. Therefore, the signal on the line 435 will be equal to the angular position between the forward position on the vehicle and the sensor position on the vehicle. The angular position between the forward position on the vehicle and the sensor position on the vehicle is defined as an offset angle ($\phi$). The other input to the summing junction 450 is a reference mode signal on a line 453 provided by a reference mode switch 457. The operation of the reference mode switch 457 is dependent upon the position of a control panel reference mode switch 257 on the control panel 200 (FIG. 4). In a vehicle reference mode, the vehicles reference axis is used for purposes of controlling the vehicle from the control panel. In a map reference mode, an earth reference, such as North, is used for control of the vehicle. In an operator reference mode, the orientation of the operator upon activation of the operator mode is used as the reference axis. The output of the summing junction 450 is the reference heading signal on line 460 which is provided to the summing junction 425. The output of the summing junction 425 is the transformation angle, and is provided on a line 467 to the pitch axis transformation 410 and the roll axis transformation 412.

The pitch axis transformation 410 uses equation 1 below for determining a transformed pitch stick signal (TPSS) to be provided on the line 470 to the pitch flight control system:

$$TPSS = \text{pitch command} * \cos(\theta) - \text{roll command} * \sin(\theta) \qquad \text{(eq. 1)}$$

Similarly, the roll axis transformation 412 using equation 2 below to provide a transformed roll stick signal (TRSS) on a line 475 to the roll flight control system:

$$TRSS = \text{roll command} * \cos(\theta) + \text{pitch command} * \sin(\theta) \qquad \text{(eq. 2)}$$

The operation of the invention is best understood by example. When the vehicle is being operated in the normal mode wherein the vehicle reference is the forward vehicle axis and in the vehicle reference mode, then the transformation function should not make any change in the pitch command 405 and roll command 415 being provided to the lines 470 and 475, i.e., TPSS=pitch command and TRSS=roll command. The vehicle heading signal is provided on the line 420 to the summing junction 425. The forward reference signal, which is zero, is provided on the line 435 to the summing junction 450. Additionally, in the vehicle reference mode, the vehicle heading is provided via the switch 457 on the line 453 to the summing junction 450. The output of the summing junction 450 is the vehicle heading on the line 460 which is subtracted from the vehicle heading signal on the line 420 in the summing junction 425. Therefore, the output of the summing junction 425 is zero on the line 467, and referring to equations 1 and 2, TPSS on the line 470 is equal to the pitch command on the line 405 and TRSS on the line 475 is equal to the roll command on the line 415 when the transformation angle is equal to zero.

When the vehicle is operating with a sensor reference in the vehicle reference mode, control inputs by the operator will cause the position of the vehicle sensor to change with respect to a vehicle frame of reference. In FIG. 6, the switch 445 will be in the sensor reference position, and a signal indicative of the angular position of the sensor with respect to the forward reference axis of the vehicle is provided on the line 435 to the summing junction 450, the other input to the summing junction 450 being the vehicle heading signal on the line 453. Therefore, the transformation angle will be the sensor reference angular position on the line 467. Therefore, TPSS and TRSS will be transformed by an amount corresponding to the angular position of the sensor reference with respect to the forward reference axis of the vehicle in the transformation functions 410, 412.

The map reference mode of operation is particularly useful when controlling the position of the vehicle using an electronic map, the electronic map having a fixed frame of reference, e.g., North. In this case, both the operator control panel and the vehicle operate with respect to the fixed frame of reference. During operation with a vehicle forward reference in the map reference mode, the output of the summing junction 450 is a signal indicative of the selected reference, e.g., North. Therefore, the transformation angle output from the summing junction 425 will be indicative of the difference between vehicle heading and the reference heading. In equations 1 and 2, the pitch command and roll command are transformed based on the difference between the aircraft heading and the map reference heading. If the map reference mode is used with a sensor reference, then the angular position of the sensor with respect to the vehicle forward reference axis is added to the map reference in the summing junction 450. Therefore, the transformations 410, 412 will also account for the angular difference between the sensor and the vehicle forward reference axis during the transformation of the pitch command and the roll command.

The operation of the operator reference mode illustrated in FIG. 6 is basically identical to the operation of the map reference mode illustrated in FIG. 6, except that the reference axis for purposes of transformation is based on the orientation of the operator control panel upon activation of the operator reference mode. Therefore, if the operator is facing North upon activation of the operator mode, the North reference will be provided on the line 453.

A problem associated with a fixed operator reference during operation in the operator reference mode is that if the operator changes position during remote operation of the vehicle, the fixed frame of reference no longer provides the advantage of intuitive roll and pitch commands. To overcome this short coming, a variable operator reference mode may be provided wherein the operator reference changes based upon changes in the orientation of the operator control panel. This may be accomplished by mounting the operator control panel on a pedestal and providing a servo or gyro signal indicative of the change in the position of the control panel With respect to the initial operator reference. Alternatively, the operator control panel may be provided with a precise position indicator such as a ring laser gyro or inertial position system so that changes in the position of the control panel will result in changes in the operator reference position.

The present invention was described in the context of an unmanned aerial vehicle because of the more complex control associated with airborne vehicles. However, it will be understood by those skilled in the art that the variable referenced control system of the present invention is applicable to any remotely operated vehicle provided that means are provided to determine the orientation of the vehicle with respect to the selected reference. The vehicle may be provided with an onboard navigation system, or means may be provided to externally sense the orientation of the vehicle with respect to the reference axis.

Although the invention has been described and illustrated with respect to exemplary embodiments thereof, it should be understood by those skilled in the art that the foregoing and various other changes, omissions, and additions may be made therein and thereto, without departing from the spirit and scope of the present invention.

We claim:

1. A variable referenced control system for controlling the operation of a remotely operated vehicle, comprising:

control means for providing control signals;

means for selecting between a fixed frame of reference with respect to the remotely operated vehicle, a fixed frame of reference with respect to earth, and a fixed frame of reference with respect to said control means;

means for providing transformation angle signals ($\theta$) indicative of the orientation of the remotely operated vehicle with respect to said selected frame of reference; and transformation means responsive to said control signals and said transformation angle signals for providing transformed control signals which control the motion of the remotely operated vehicle with respect to said selected frame of reference.

2. The variable referenced control system according to claim 1 further comprising means for selecting a reference location on the remotely operated vehicle, said transformation means being responsive to said reference location for controlling the motion of said reference location with respect to said selected frame of reference in response to said control signals and said transformation angle signals.

3. The variable referenced control system according to claim 2 wherein the angular orientation between said reference location and a fixed reference location on the remotely operated vehicle is defined by an offset angle ($\phi$).

4. The variable referenced control system according to claim 3 wherein said control means provides control signals in an orthogonal axis system with respect to said control means, said orthogonal axis system being defined by an x direction and a y direction orthogonal to said x direction, said control means providing x control signals in said x direction and y control signals in said y direction.

5. The variable referenced control system according to claim 4 wherein said transformation means provides x transformed control signals in said x direction defined by the following relationship:

$$x \text{ transformed control signal} = x \text{ control signal} * \cos(\theta-\phi) - y \text{ control signal} * \sin(\theta-\phi)$$

and wherein said transformation means provides y transformed control signals in said y direction defined by the following relationship:

$$y \text{ transformed control signal} = y \text{ control signal} * \cos(\theta-\phi) + x \text{ control signal} * \sin(\theta-\phi).$$

6. The variable referenced control system according to claim 1 wherein said control means provides control signals in an orthogonal axis system with respect to said control means, said orthogonal axis system being defined by an x direction and a y direction orthogonal to said x direction, said control means providing x control signals in said x direction and y control signals in said y direction.

7. The variable referenced control system according to claim 6 wherein said transformation means provides x transformed control signals in said x direction defined by the following relationship:

$$x \text{ transformed control signal} = x \text{ control signal} * \cos(\theta) - y \text{ control signal} * \sin(\theta)$$

and wherein said transformation means provides y transformed control signals in said y direction defined by the following relationship:

$$y \text{ transformed control signal} = y \text{ control signal} * \cos(\theta) + x \text{ control signal} * \sin(\theta).$$

* * * * *